United States Patent
Kan et al.

(10) Patent No.: US 7,749,640 B2
(45) Date of Patent: Jul. 6, 2010

(54) FUEL CELL

(75) Inventors: Hirofumi Kan, Tokyo (JP); Asako Satoh, Yokohama (JP); Akira Yajima, Tokyo (JP); Yumiko Takizawa, Yokohama (JP); Hiroyuki Shiroki, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/837,071

(22) Filed: Aug. 10, 2007

(65) Prior Publication Data

US 2007/0287058 A1    Dec. 13, 2007

Related U.S. Application Data

(63) Continuation of application No. PCT/JP2006/302369, filed on Feb. 10, 2006.

(30) Foreign Application Priority Data

Feb. 10, 2005    (JP) .............................. 2005-034609

(51) Int. Cl.
    H01M 4/86    (2006.01)
(52) U.S. Cl. .......................... 429/42; 429/30
(58) Field of Classification Search ............ 429/42, 429/30
    See application file for complete search history.

(56) References Cited

U.S. PATENT DOCUMENTS

| | | | |
|---|---|---|---|
| 5,677,074 A | 10/1997 | Serpico et al. | |
| 6,485,851 B1 * | 11/2002 | Narayanan et al. | ............ 429/17 |
| 2003/0049510 A1 * | 3/2003 | Ren | ............ 429/30 |
| 2004/0101741 A1 | 5/2004 | Minteer et al. | |
| 2005/0238948 A1 | 10/2005 | Mei et al. | |

FOREIGN PATENT DOCUMENTS

| | | |
|---|---|---|
| AP | 2004-6266 | 1/2004 |
| CN | 1386308 | 12/2002 |
| EP | 1 320 140 | 6/2003 |
| JP | 8-78029 | 3/1996 |
| JP | 2002-63912 | 2/2002 |
| JP | 2002-373677 | 12/2002 |
| JP | 3413111 | 3/2003 |
| JP | 2004-6335 | 1/2004 |
| JP | 2005-310714 | 11/2005 |
| KR | 2002-0042702 | 6/2002 |

OTHER PUBLICATIONS

U.S. Appl. No. 11/836,821, filed Aug. 10, 2007, Kan, et al.
U.S. Appl. No. 11/720,149, filed May 24, 2007, Negishi, et al.
U.S. Appl. No. 11/576,693, filed Apr. 5, 2007, Negishi, et al.
U.S. Appl. No. 11/863,725, filed Sep. 28, 2007, Satoh, et al.

* cited by examiner

Primary Examiner—Jane Rhee
(74) Attorney, Agent, or Firm—Oblon, Spivak, McClelland, Maier & Neustadt, L.L.P.

(57) ABSTRACT

A fuel cell comprising a cathode catalyst layer, an anode catalyst layer including a conductive perfluoro-binder having a micellar structure formed by outwardly orienting hydrophilic groups and inwardly orienting hydrophobic (lipophilic) groups, and a proton conductive membrane provided between the cathode catalyst layer and the anode catalyst layer.

20 Claims, 1 Drawing Sheet

FUEL CELL

CROSS-REFERENCE TO RELATED APPLICATIONS

This is a Continuation Application of PCT Application No. PCT/JP2006/302369, filed Feb. 10, 2006, which was published under PCT Article 21(2) in Japanese.

This application is based upon and claims the benefit of priority from prior Japanese Patent Application No. 2005-034609, filed Feb. 10, 2005, the entire contents of which are incorporated herein by reference.

BACKGROUND OF THE INVENTION

1. Field of the Invention

The invention relates to a fuel cell in which a liquid fuel or a vaporized fuel obtained by vaporizing the liquid fuel is supplied to an anode catalyst layer.

2. Description of the Related Art

In recent years, various types of electronic devices such as personal computers and mobile telephones have been reduced in size as the semiconductor technology advances, and there have been attempts in which a fuel cell is used as the power source of a small-sized device. A fuel cell has such advantages that it can generate electrical power merely by supplying the fuel and oxidizer thereto, and it can continuously generate power merely by replacing the fuel. Therefore, when the downsizing can be achieved, it would create an extremely advantageous system for the operation of mobile electronic devices. Especially, the direct methanol fuel cell (DMFC) uses methanol having a high energy density as its fuel and can generate an electrical current on the electrode catalyst from methanol. Thus, this cell does not require a reformer, and therefore it can be reduced in size. Since the handling of the fuel is easy as compared to that of a hydrogen gas fuel, it is a hopeful power source for small-sized devices.

Known methods for supplying the fuel of DMFC include a gas supplying DMFC for sending a liquid fuel into the fuel cell with a blower or the like after vaporizing the liquid fuel, a liquid supplying DMFC for directly sending a liquid fuel into the fuel cell with a pump or the like, and an internal-vaporization DMFC as shown in Japanese Patent No. 3413111. The internal-vaporization DMFC discloses a fuel penetration layer which retains the liquid fuel and a fuel transmitting layer that diffuses vaporized components of the liquid fuel retained in the fuel penetration layer, and has such a structure that the vaporized components of the liquid fuel is supplied from the fuel transmitting layer to the fuel electrode.

However, power performance of DMFC are not sufficient as compared with those of fuel cells using the hydrogen gas fuel since resistance of the reaction for internal reforming of methanol is high.

BRIEF SUMMARY OF THE INVENTION

An object of the invention is to provide a fuel cell having improved power performance by improving proton conductivity of a conductive perfluoro-binder contained in an anode catalyst layer.

According to an aspect of the present invention, there is provided a fuel cell comprising:

a cathode catalyst layer;

an anode catalyst layer including a conductive perfluoro-binder having a micellar structure formed by outwardly orienting hydrophilic groups and inwardly orienting hydrophobic (lipophilic) groups; and a proton conductive membrane provided between the cathode catalyst layer and the anode catalyst layer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
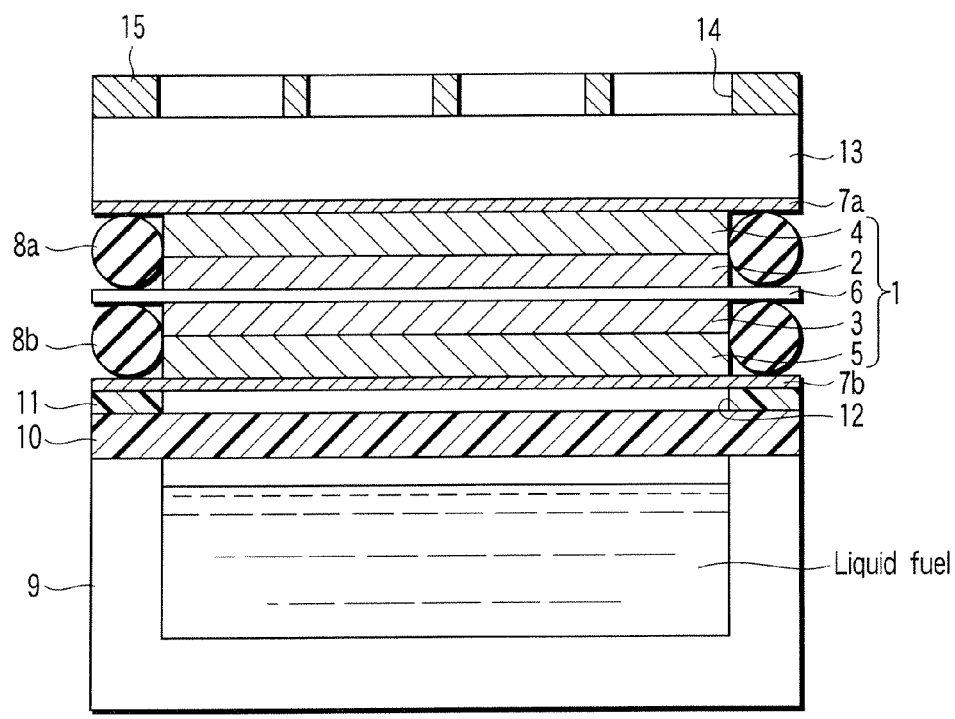
FIG. 1 is a schematic cross section showing a direct methanol fuel cell according to an embodiment of the invention.

In order to solve the above problem, the inventors of the present invention have investigated, through intensive studies, that proton conductivity of a conductive perfluoro-binder is related to a micellar structure of the binder, and found that proton conductivity is improved by the conductive perfluoro-binder having the micellar structure formed by outwardly orienting hydrophilic groups and inwardly orienting hydrophobic (lipophilic) groups, and that the reaction resistance of the internal reforming reaction of methanol is reduced.

That is, the reaction resistance of the internal reforming reaction of methanol is reduced by providing an anode catalyst layer containing the conductive perfluoro-binder having the micellar structure. For this reason, voltage drop caused by increasing a load current may be reduced, and a fuel cell excellent in power performance may be obtained.

The anode catalyst layer will be described first.

Examples of the catalyst contained in the anode catalyst layer (referred to as an anode catalyst hereinafter) include pure metals of the platinum group element (such as Pt, Ru, Rh, Ir, Os and Pd) and alloys containing the platinum group element. While the anode catalyst preferably contains a Pt—Ru alloy highly resistant to methanol and carbon monoxide, the catalyst is not restricted thereto. A supported catalyst using a conductive support such as a carbon material or a non-supported catalyst may be used.

A granular carbon material, a fibrous carbon material or a composite material of the carbon material and the fibrous carbon material as disclosed in Jpn. Pat. Appln. KOKAI Publication No. 2005-310714 may be used for the conductive support of the anode catalyst layer. Since internal reforming reaction resistance can be further reduced by using such a material, power performance of the fuel cell can be more improved. Examples of the fibrous carbon material of the composite material described in Jpn. Pat. Appln. KOKAI Publication No. 2005-310714 includes carbon nano-fibers having a herringbone structure or platelet structure. Examples of the carbon material include carbon black particles.

Examples of the conductive perfluoro-binder include fluorinated resins having sulfonic acid groups (for example, perfluoro-sulfonic acid polymers). An example of the perfluoro-sulfonic acid polymer is shown by the following chem 1.

[chem 1]

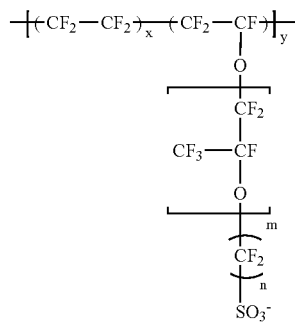

where chem 1, x, y, m and n are integers satisfying the relations of x>0, y>0, m≧0 and n≧0, respectively.

When the resin is represented by chem 1, the perfluoroalkyl group $[(CF_2CF_2)_x—(CF_2CF)]_y$ represents a hydrophobic (lipophilic) group while $\{(CF_2)_n—SO_3^-\}$ represents a hydrophilic group.

The conductive perfluoro-binder such as the perfluorosulfonic acid polymer forms a stable micelle in a solution by outwardly orienting the hydrophilic group and inwardly orienting the hydrophobic (lipophilic) group. The micelle starts to be converted into an inverted micellar structure by drying with heating at a temperature of 120° C. or more, and the inverted micellar structure is stabilized at a temperature of above 135° C. It is possible to convert the micellar structure into the inverse micellar structure at a lower temperature under a reduced pressure.

The anode catalyst layer containing the conductive perfluoro-binder having the micellar structure may be obtained by adjusting the concentration of the conductive perfluoro-binder and the contents of the anode catalyst and conductive perfluoro-binder in a specified range when a paste is prepared.

The paste is prepared, for example, by adding a solution of the conductive perfluoro-binder, water and an organic solvent such as methoxy propanol to the anode catalyst with mixing.

The concentration of the solution of the conductive perfluoro-binder is desirably in the range of 10 to 70% by weight, more preferably 30 to 50% by weight, for the following reason. Control of the viscosity of the paste is difficult and paintablity of the paste may be decreased when the concentration of the binder solution is less than 10% by weight or exceeds 70% by weight.

The blending ratio of the anode catalyst and binder solution is desirably adjusted so that the content of the anode catalyst in the anode catalyst layer is in the range of 5 to 50% by weight, more preferably 10 to 30% by weight, and the content of the conductive perfluoro-binder is in the range of 1 to 20% by weight, more preferably 5 to 15% by weight, for the following reason. The bond strength between the anode catalyst layer and the proton conductive membrane may be decreased when the content of the anode catalyst is larger than the above-mentioned range or the content of the binder is smaller than the above-mentioned range. Further, the reaction resistance in the internal reforming reaction of methanol may be increased when the content of the anode catalyst is smaller or the content of the binder is larger than the above-described range.

By applying the paste obtained on porous carbon paper as an anode gas diffusion layer and drying the paste, and the anode catalyst layer containing the conductive perfluoro-binder having the micellar structure is obtained.

The conductive perfluoro-binder having the micellar structure has high solubility in methanol. Accordingly, it may be confirmed that the anode catalyst layer contains the conductive perfluoro-binder having the micellar structure when the weight loss of the anode catalyst layer exceeds 10% after immersing the anode catalyst layer in 100% by weight of a methanol solution maintained at 25° C. for 24 hours.

The cathode catalyst layer will be described below.

The cathode catalyst layer contains a cathode catalyst and a proton conductive binder.

Examples of the cathode catalyst include pure metals of the platinum group element (Pt, Ru, Rh, Ir, Os and Pd), and alloys containing the platinum group element. While platinum is preferably used for the cathode catalyst, the material is not restricted thereto. Either a supported catalyst using a conductive support such as a carbon material or a non-supported catalyst may be used.

While examples of the proton conductive binder include conductive perfluoro-binders (for example, fluorinated resins having sulfonic acid groups such as perfluorosulfonic acid polymers), hydrocarbon resins having the sulfonic acid group, and inorganic compounds such as tungstic acid and phosphorus wolframate, the material is not restricted thereto. The conductive perfluoro-binder is preferable among them.

The conductive perfluoro-binder may have either the micellar structure or the inverse micellar structure.

Since proton conductivity of the cathode is improved by using the conductive perfluoro-binder having the micellar structure, power performance when the load current is increased may be improved. Since the cathode catalyst layer containing the conductive perfluoro-binder having the inverse micellar structure is excellent in chemical stability, stability of voltage when the load current is decreased may be improved.

The conductive perfluoro-binder in the cathode catalyst layer has the inverse micellar structure when the weight loss of the cathode catalyst layer is 10% or less after immersing the cathode catalyst layer in 100% by weight of a methanol solution maintained at 25° C. for 24 hours, while the conductive perfluoro-binder has the micellar structure when the weight loss exceeds 10%.

The cathode catalyst layer is manufactured by the method described below.

A paste is prepared by adding the conductive perfluoro-binder solution, water and an organic solvent such as methoxy propanol to the cathode catalyst with mixing. The paste obtained is applied on porous carbon paper as a cathode gas diffusion layer, and the paste is dried and subjected to heat treatment to form the cathode catalyst layer on the cathode gas diffusion layer.

The concentration of the conductive perfluoro-binder solution is desirably in the range of 10 to 70% by weight for the following reason. The viscosity of the paste may be hardly controlled and paintablity of the paste may be decreased when the concentration of the binder solution is less than 10% by weight or greater than 70% by weight.

Desirably, the amounts of blending of the cathode catalyst and conductive perfluoro-binder solution are adjusted so that the content of the cathode catalyst in the cathode catalyst layer is in the range of 5 to 50% by weight, more preferably 10 to 30% by weight, and the content of the conductive perfluoro-binder in the cathode catalyst layer is in the range of 1 to 20% by weight, more preferably 5 to 15% by weight, for the following reason. The bond strength between the cathode catalyst layer and the proton conductive membrane may be decreased when the content of the cathode catalyst is larger than the above-mentioned range or the content of the binder is smaller than the above-mentioned range. Further, the reaction resistance of the power generating reaction may be increased when the content of the cathode catalyst is small or the content of the binder is large.

The cathode catalyst layer containing the conductive perfluoro-binder having the micellar structure is obtained by adjusting the concentration of the conductive perfluoro-binder solution and the contents of the cathode catalyst and conductive perfluoro-binder in the above-mentioned ranges.

The cathode catalyst layer is converted into the inverse micellar structure by heat treatment at a temperature exceeding 135° C. to 240° C. or less, more preferably from 180 to 200° C. under a normal pressure atmosphere, and the cathode catalyst layer containing the conductive perfluoro-binder having the inverse micellar structure is obtained. While the cathode catalyst layer is readily converted into the inverse micellar structure at a higher temperature, the heat treatment temperature is desirably within the above-mentioned range since the binder is decomposed by heat when the heat treatment temperature is increased.

It is desirable to use the granular carbon material, fibrous carbon material or composite material as described in the anode catalyst layer for the conductive support of the cathode catalyst layer. Since the structure of the cathode catalyst layer is highly stabilized by using such a carbon material, the weight loss of the cathode may be reduced when it is immersed in methanol after the heat treatment, and chemical stability of the cathode may be improved.

Since internal reforming reaction resistance is reduced according to the invention, the invention is favorably applied for the fuel cell using a methanol-containing fuel. The vaporized components of the methanol-containing fuel may be supplied to the anode catalyst layer, or the fuel may be supplied to the anode catalyst layer as the liquid itself. According to the invention, the internal reforming reaction resistance may be largely reduced when the methanol concentration of the fuel is high.

Examples of the methanol-containing fuel include an aqueous methanol solution and pure methanol. The concentration of methanol in the aqueous methanol solution is desirably as high as more than 50 mol %. The purity of pure methanol is desirably in the range of 95 to 100% by weight. A fuel cell having high energy density and being excellent in power performance may be provided when the methanol concentration or the purity is in the above-mentioned range.

The direct methanol fuel cell as an embodiment of the fuel cell according to the invention will be described below with reference to the drawings.

FIG. 1 is a schematic cross section showing the direct methanol fuel cell according to an embodiment of the invention.

As shown in FIG. 1, a membrane electrode assembly (MEA) 1 includes a cathode composed of a cathode catalyst layer 2 and a cathode gas diffusion layer 4, an anode composed of an anode catalyst layer 3 and an anode gas diffusion layer 5, and a proton conductive electrolyte membrane 6 disposed between the cathode catalyst layer 2 and the anode catalyst layer 3.

While examples of the proton conductive material constituting the proton conductive electrolyte membrane 6 include fluorinated resins having sulfonic acid groups (for example a polymer of perfluorosulfonic acid), hydrocarbon resins having sulfonic acid groups, and inorganic compounds such as tungstic acid and phosphorus wolframate, the material is not restricted thereto.

The cathode catalyst layer 2 is laminated on the cathode gas diffusion layer 4, and the anode catalyst layer 3 is laminated on the anode gas diffusion layer 5. While the cathode gas diffusion layer 4 serves for evenly supplying an oxidant to the cathode catalyst layer 2, the cathode gas diffusion layer 4 also serves as a current collector of the cathode catalyst layer 2. On the other hand, the anode gas diffusion layer 5 serves for evenly supplying the fuel to the anode catalyst layer 3 while it also serves as a current collector of the anode catalyst layer 3. A cathode conductive layer 7a and an anode conductive layer 7b are in contact with the cathode gas diffusion layer 4 and anode gas diffusion layer 5, respectively. A porous layer (for example a mesh) made of a metal material such as gold may be used for the cathode conductive layer 7a and an anode conductive layer 7b.

A rectangular frame of a cathode seal member 8a is positioned between the cathode conductive layer 7a and the proton conductive electrolyte membrane 6, and surrounds the cathode catalyst layer 2 and cathode gas diffusion layer 4. On the other hand, a rectangular frame of an anode seal member 8b is positioned between the anode conductive layer 7b and the proton conductive electrolyte membrane 6, and surrounds the anode catalyst layer 3 and anode gas diffusion layer 5. The cathode seal member 8a and anode seal member 8b are O-rings provided for preventing the fuel and oxidant from leaking out of the membrane electrode assembly 1.

A liquid fuel tank 9 is placed under the membrane electrode assembly 1. The liquid fuel tank 9 is filled with liquid methanol or an aqueous methanol solution. As a fuel transmitting layer 10, for example, a gas-liquid separation membrane 10 which permeates only the vaporized component of the liquid fuel and does not permeate the liquid fuel, is arranged at the opening end of the liquid fuel tank 9 so as to cover the opening of the liquid fuel tank 9. The vaporized component of the liquid fuel as used herein refers to vaporized methanol when pure methanol is used as the liquid fuel, while the vaporized component of the liquid fuel refers to a mixed gas containing the vaporized component of methanol and vaporized component of water when an aqueous methanol solution is used as the liquid fuel.

A resin frame 11 is laminated between the gas-liquid separation membrane 10 and the anode conductive layer 7b. The space surrounded by the frame 11 serves as a vaporized fuel container 12 (so-called vapor pool) for temporarily storing the vaporized fuel diffused through the gas-liquid separation membrane 10. A large quantity of the vaporized fuel is prevented from being supplied at once to the anode catalyst layer 3 by the effect of the vaporized fuel container 12 and gas-liquid separation membrane 10 for suppressing the amount of transmitted methanol. In other words, methanol cross-over may be suppressed from occurring. The frame 11 is a rectangular frame made of a thermoplastic polyester resin such as PET.

A moisture retaining plate 13 is laminated on the cathode conductive layer 7a laminated on the membrane electrode assembly 1. A surface layer 15 having a plurality of air inlet ports 14 for importing air as the oxidant is laminated on the moisture retaining plate 13. Since the surface layer 15 also serves for enhancing adhesivity by compressing a stack including the membrane electrode assembly 1, the surface layer 15 is made of a metal such as SUS 304. The moisture retaining plate 13 serves for suppressing evaporation of water generated in the cathode catalyst layer 2 while the moisture retaining plate 13 serves as an auxiliary diffusion layer for enhancing uniform diffusion of the oxidant into the cathode catalyst layer 2 by uniformly introducing the oxidant into the cathode gas diffusion layer 4.

According to the direct methanol fuel cell so constructed as described above, the liquid fuel (for example, an aqueous methanol solution) in the liquid fuel tank 9 is vaporized, and vaporized methanol and water diffuse through the gas-liquid separation membrane 10. The vaporized gases are temporarily stored in the vaporized fuel container 12, and slowly supplied to the anode catalyst layer 3 by diffusing through the anode gas diffusion layer 5 from the container, so that the internal reforming reaction represented by reaction formula (1) is invoked.

$$CH_3OH + H_2O \rightarrow CO_2 + 6H^+ + 6e^- \quad (1)$$

No water is supplied from the fuel transmitting layer when pure methanol is used as the liquid fuel. Accordingly, water generated by an oxidation reaction of methanol mingled into the cathode catalyst layer 2 or moisture contained in the proton conductive electrolyte membrane 6 reacts with methanol to invoke the internal reforming reaction represented by formula (1). Alternatively, some other internal reforming reaction different from that indicated by the formula (1) under a reaction mechanism in which water is not involved.

Proton ($H^+$) formed by the internal reforming reaction diffuses through the proton conductive electrolyte membrane 6 and arrives at the cathode catalyst layer 3. On the other hand, air imported from the air inlet port 14 of the surface layer 15 is supplied to the cathode catalyst layer 2 after diffusing through the moisture retaining plate 13 and cathode gas diffusion layer 4. In the cathode catalyst layer 2, the reaction represented by the following formula (2) takes place to generate water, and this is an electrical power generating reaction.

$$(3/2)O_2 + 6H^+ + 6e^- \rightarrow 3H_2O \quad (2)$$

Water generated in the cathode catalyst layer 2 by the reaction represented by formula (2) or the like reaches the moisture retaining plate 13 after diffusing in the cathode gas diffusion layer 4 when the power generating reaction advances, and the amount of water stored in the cathode catalyst layer 2 increases since evaporation of water is prevented by the moisture retaining plate 13. Therefore, a state in which the amount of water held by the cathode catalyst layer 2 is larger than the amount of water held by the anode catalyst layer 3 occurs as the power generating reaction proceeds. Consequently, it is possible to create such a state that the amount of moisture retained in the cathode catalyst layer 2 is larger than that of the anode catalyst layer 3. As a result, due to the osmotic phenomenon, the reaction that transfers the water generated in the cathode catalyst layer 2 to the anode catalyst layer 3 via the proton conductive electrolyte membrane 6 is promoted. Thus, rate of water supply to the anode catalyst layer can be improved compared to the case of relying only on a fuel transmitting layer and the internal reforming reaction of methanol represented by formula (1) is facilitated. Therefore, the power density may be increased while the high power density is maintained for a long period of time.

Water diffused to the anode catalyst layer 3 from the cathode catalyst layer 2 is exclusively used for the internal reforming reaction when an aqueous methanol solution with a concentration exceeding 50 mol % or pure methanol is used as the liquid fuel, and water supply to the anode catalyst layer 3 is stabilized. Therefore, the reaction resistance of the internal reforming reaction of methanol may be further reduced to enable long term power performance and load current performance to be further improved. In addition, the size of the liquid fuel tank may be also reduced. The purity of pure methanol is desirably in the range of 95 to 100% by weight.

When the anode catalyst layer 3 contains the conductive perfluoro-binder having the micellar structure, the reaction resistance of internal reforming of methanol may be reduced even by using the aqueous methanol solution having a concentration exceeding 50 mol % or pure methanol as the liquid fuel. Consequently, a direct methanol fuel cell having high energy density and being excellent in power performance may be provided.

When the liquid fuel is supplied to the anode catalyst layer, it is recommended that arranged are a separator having an oxidant flow passageway formed on the cathode gas diffusion layer 4 of the membrane electrode assembly 1 which has the same configuration as described in FIG. 1 and a separator having a liquid fuel flow passageway formed on the anode gas diffusion layer 5 of the membrane electrode assembly 1.

Examples of the invention will be described in detail below with reference to the drawings.

Example 1

Preparation of Anode

A solution of perfluorocarbon sulfonic acid (8.5% by weight as converted into a solid fraction) with a concentration of 20% by weight, water and methoxy propanol were added to 17% by weight of spherical carbon black that retains an anode catalyst (Pt:Ru=1:1), and the catalyst-retaining carbon black was dispersed to prepare a paste. An anode catalyst layer was formed by applying the paste obtained on porous carbon paper as an anode gas diffusion layer to obtain an anode with a thickness of 450 μm.

An anode formed by laminating the anode catalyst layer on the anode gas diffusion layer was immersed in 100% by weight of a methanol solution kept at 25° C. for 24 hours, and weight loss ratio of the anode catalyst layer was measured. Since the weight loss ratio was 70%, it was confirmed that perfluorocarbon sulfonic acid had a micellar structure.

<Preparation of Cathode>

A solution of perfluorocarbon sulfonic acid (8.5% by weight as converted into a solid fraction) with a concentration of 20% by weight, water and methoxy propanol were added to 17% by weight of fibrous carbon black that retains a cathode catalyst (Pt), and the catalyst-retaining carbon black was dispersed to prepare a paste. A cathode catalyst layer was formed by applying the paste obtained on porous carbon paper as a cathode gas diffusion layer to obtain a cathode with a thickness of 400 μm.

A cathode formed by laminating the cathode catalyst layer on the cathode gas diffusion layer was immersed in 100% by weight of a methanol solution kept at 25° C. for 24 hours, and weight loss ratio of the cathode catalyst layer was measured. Since the weight loss ratio was 40%, it was confirmed that perfluorocarbon sulfonic acid had a micellar structure.

A perfluorocarbon sulfonic acid membrane (trade name: Nafion Membrane, manufactured by DuPont Co.) with a thickness of 60 μm and water content ratio from 10 to 20% by weight, as a proton conductive electrolyte membrane, was interposed between the anode catalyst layer and the cathode catalyst layer, and subjected to hot-press with heating at a temperature of 115° C. in the vicinity of the membrane to obtain a membrane electrode assembly (MEA).

A polyethylene porous film with a thickness of 500 μm, an air permeability coefficient of 2 seconds/100 cm³ (JIS P-8117) and a moisture permeability coefficient of 4000 g/m²·24 hr (JIS L-1009 A-1) was prepared as a moisture retaining plate.

The frame 11 was made of PET with a thickness of 25 μm. A silicone rubber sheet with a thickness of 200 μm was prepared as a gas-liquid separation membrane.

A direct methanol fuel cell of an internal vaporization type having the structure shown in FIG. 1 was assembled by using the membrane electrode assembly 1, moisture retaining plate 13, frame 11 and gas-liquid separation membrane 10. Pure methanol (10 mL) with a purity of 99.9% by weight was stored in the fuel tank.

Example 2

A cathode was heat-treated at 180° C. for 30 minutes in a N₂ atmosphere. The cathode was then immersed in 100% by weight of a methanol solution kept at 25° C. for 24 hours, and the weight loss ratio of the cathode catalyst layer was measured. It was confirmed from the measured ratio of 6% that perfluorocarbon sulfonic acid had an inverse micellar structure.

A direct methanol fuel cell of an internal vaporization type having the structure as shown in FIG. 1 was assembled in the same manner as described in Example 1, except that the above-mentioned cathode was used.

Comparative Example

An anode catalyst layer was formed on an anode gas diffusion layer in the same manner as described in Example 1. The anode obtained was heat-treated at 200° C. for 30 minutes in a N₂ atmosphere.

Then, the anode was immersed in 100% by weight of a methanol solution kept at 25° C. for 24 hours, and the weight loss ratio of the anode catalyst layer was measured. It was confirmed from the ratio of 6% that parfluorocarbon sulfonic acid had an inverse micellar structure.

A direct methanol fuel cell of an internal vaporization type having the structure shown in FIG. 1 was assembled in the same manner as described in Example 1, except that the anode obtained and the same cathode as described in Example 2 were used.

Figure 2:
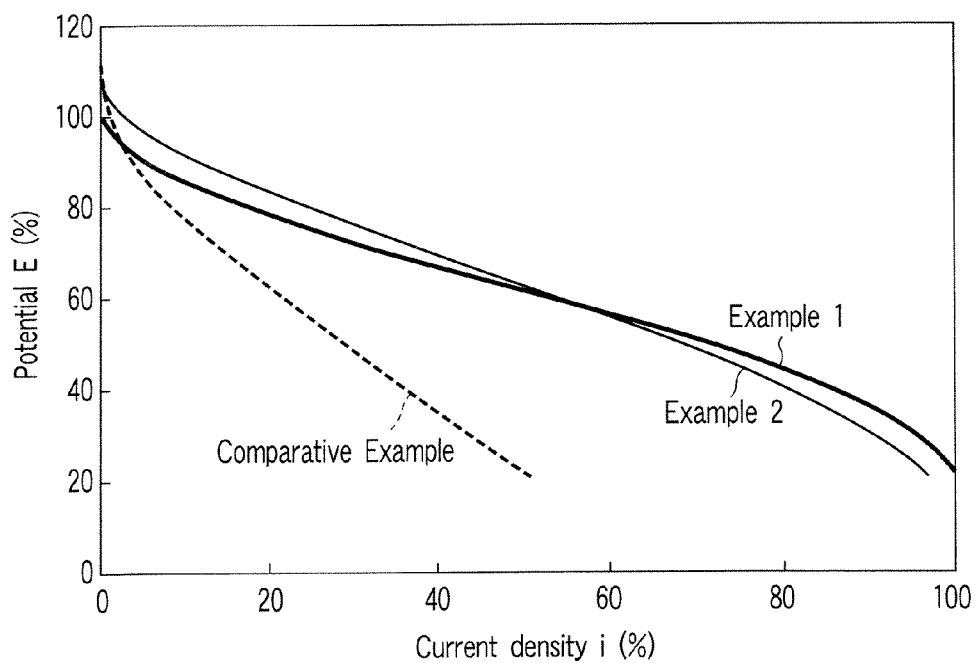
FIG. 2 is a characteristic graph indicating the relation between the load current density and cell potential of direct methanol fuel cells in Examples 1 and 2 and Comparative Example.

Electricity was generated by using the fuel cells obtained in Examples 1 and 2 and Comparative Example by increasing the load current stepwise. The relation between the cell potential and load current is shown in FIG. 2. In FIG. 2, the horizontal axis shows the current density (Current density) and the vertical axis shows the cell potential (Potential). The potential is expressed as relative values with the highest potential (initial potential) defined as 100%. The current density is shown by a relative value.

As shown in FIG. 2, the fuel cells of Examples 1 and 2 having the anode catalyst layer containing the conductive perfluoro-binder having a micellar structure was able to reduce the potential drop when the load current was increased as compared with the fuel cell of Comparative Example in which both the binders of the anode catalyst layer and cathode catalyst layer had inverse micellar structures.

Power performance when the load current was increased were excellent in the fuel cell of Example 1 in which both binders of the anode catalyst layer and cathode catalyst layer had a micellar structure. On the contrary, power performance when the load current is decreased were excellent in the fuel cell of Example 2 in which the binder of the anode catalyst layer had a micellar structure and the binder of the cathode catalyst layer had an inverse micellar structure.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A fuel cell comprising
a cathode catalyst layer comprising a conductive perfluoro-binder having a micellar structure formed by outwardly orienting hydrophobic (lipophilic) groups and inwardly orienting hydrophilic groups;
an anode catalyst layer comprising a conductive perfluoro-binder having a micellar structure formed by outwardly orienting hydrophilic groups and inwardly orienting hydrophobic (lipophilic) groups; and
a proton conductive membrane provided between the cathode catalyst layer and the anode catalyst layer,
wherein the anode catalyst layer shows a weight loss exceeding 10% after immersing the layer in 100% by weight of a methanol solution kept at 25° C. for 24 hours, and the cathode catalyst layer shows a weight loss of 10% or less after immersing the layer in 100% by weight of a methanol solution kept at 25° C. for 24 hours.

2. The fuel cell according to claim 1, wherein the conductive perfluoro-binder is a fluorinated resin having sulfonic acid groups.

3. The fuel cell according to claim 1, further comprising a fuel containing methanol and supplied to the anode catalyst layer.

4. The fuel cell according to claim 3, wherein a methanol concentration in the fuel is in the range from larger than 50 mol % to 100 mol % or less.

5. The fuel cell according to claim 1, further comprising an anode gas diffusion layer.

6. The fuel cell according to claim 5, wherein the anode catalyst layer is prepared by applying a paste comprising the anode catalyst and a conductive perfluoro-binder solution on the anode gas diffusion layer and drying the paste, wherein the concentration of the conductive perfluoro-binder in the solution is in the range of 10 to 70% by weight, and wherein the content of the conductive perfluoro-binder in the anode catalyst layer is in the range of 1 to 20% by weight and the content of the anode catalyst in the anode catalyst layer is in the range of 5 to 50% by weight.

7. The fuel cell according to claim 6, wherein the anode catalyst layer is prepared by applying a paste comprising the anode catalyst and a conductive perfluoro-binder solution on the anode gas diffusion layer and drying the paste, wherein the concentration of the conductive perfluoro-binder in the solution is in the range of 30 to 50% by weight, and wherein the content of the conductive perfluoro-binder in the anode catalyst layer is in the range of 5 to 15% by weight and the content of the anode catalyst in the anode catalyst layer is in the range of 10 to 30% by weight.

8. The fuel cell according to claim 5, wherein the anode gas diffusion layer comprises porous carbon paper.

9. The fuel cell according to claim 6, wherein the anode gas diffusion layer comprises porous carbon paper.

10. The fuel cell according to claim 7, wherein the anode gas diffusion layer comprises porous carbon paper.

11. The fuel cell of claim 1, wherein the micellar structure of the conductive perfluoro-binder of the cathode catalyst layer is an inverse micellar structure.

12. The fuel cell of claim 1, wherein the anode catalyst layer further comprises an anode catalyst comprising a material selected from Pt, Ru, Rh, Ir, Os, Pd, and alloys thereof.

13. The fuel cell of claim 12, wherein the anode catalyst is supported on a conductive carbon material.

14. The fuel cell of claim 12, wherein the anode catalyst comprises a Pt—Ru alloy.

15. The fuel cell of claim 14, wherein the anode catalyst is supported on a conductive carbon material.

16. The fuel cell of claim 1, wherein the cathode catalyst layer further comprises a cathode catalyst comprising a material selected from Pt, Ru, Rh, Ir, Os, Pd, and alloys thereof.

17. The fuel cell of claim 16, wherein the cathode catalyst is supported on conductive carbon material.

18. The fuel cell of claim 14, wherein the cathode catalyst comprises Pt.

19. The fuel cell of claim 18, wherein the cathode catalyst is supported on a conductive carbon material.

20. The fuel cell of claim 1, wherein the cathode catalyst layer is comprised by a cathode, and wherein the cathode has a thickness of 400 μm.

* * * * *